United States Patent Office 3,068,590
Patented Dec. 18, 1962

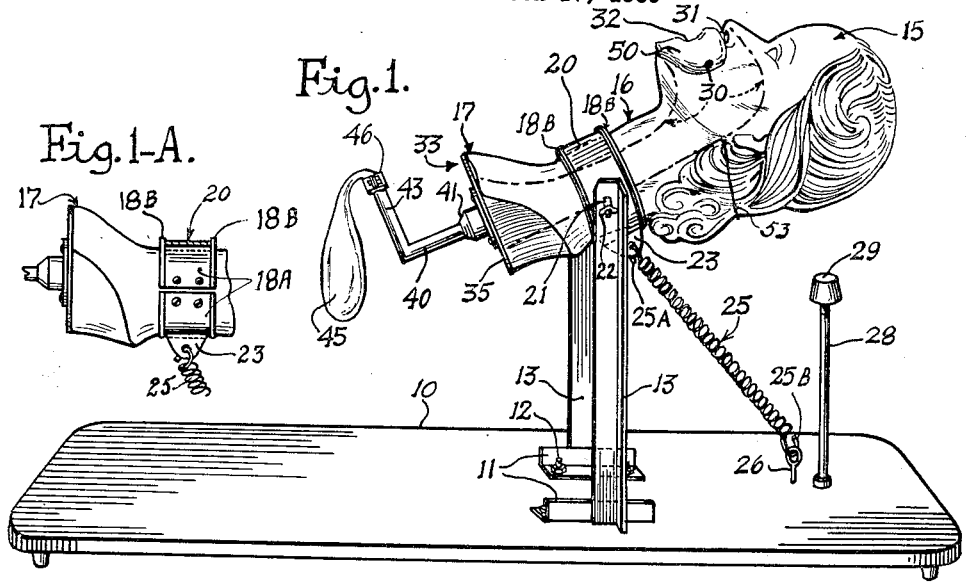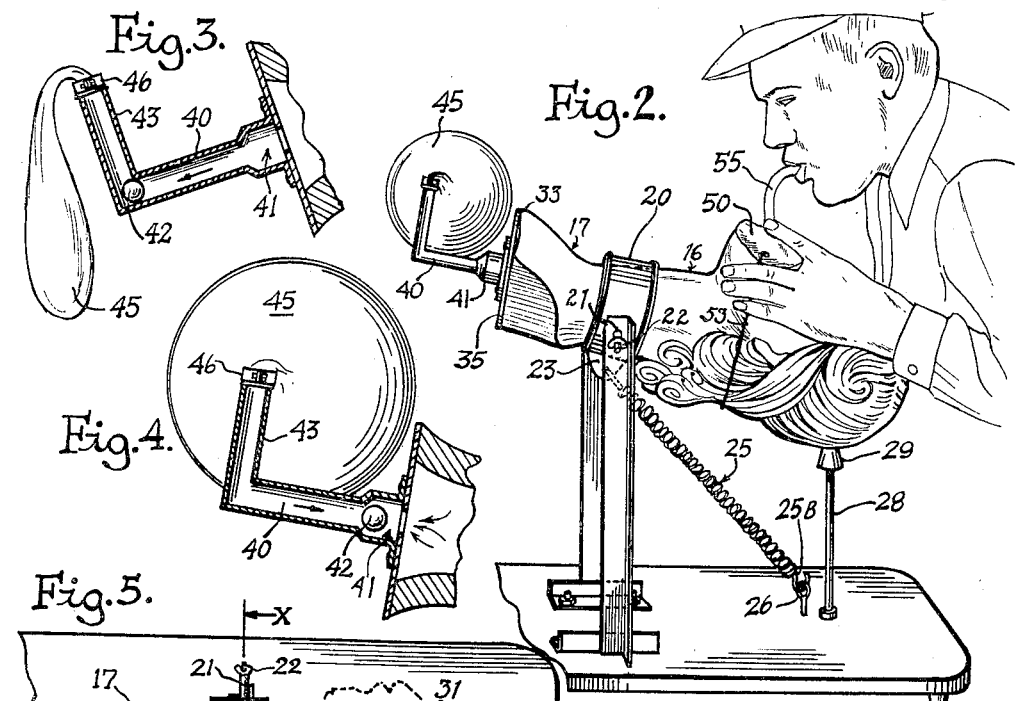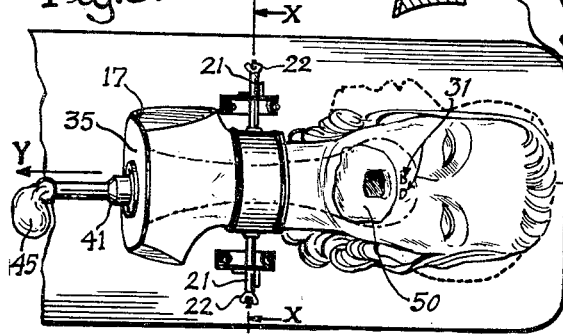

3,068,590
RESUSCITATION TRAINING DEVICE
Ralph M. Padelliford, 1712 5th St., Nevada, Iowa
Filed Mar. 17, 1960, Ser. No. 15,584
7 Claims. (Cl. 35—17)

This invention has as its principal object the provision of a device for facilitating the demonstration and practice of artificial respiration techniques, especially mouth-to-mouth respiration or insufflation, such device comprising a manikin of compact and simple character having special features of mobility some of which are operative in conjunction with visual indicating means simulative of the victim's lung action to oblige the trainee to perform certain critical operations in order to produce an indication of responsive lung action signifying that the proper techniques are being employed.

The novel training device comprises more particularly a manikin apparatus of portable character especially suited to lecture-table demonstration and preferably limited in configuraton to simulated head, neck, and partial thorax or chest portions of the human body and supported by mechanism permitting certain postural movements of significance in respiratory manipulation, and additionally having posturally-controlled means automatically indicating to the trainee that certain manipulations of the technique should be effected, and whether or not they are being effected, together with other structural features rendering the device also suited to training or demonstration in uses of known types of inhalator equipment.

Additional objects and aspects of novelty and utility relate to details of the construction and operation of the illustrative embodiment described hereinafter in view of the annexed drawing in which:

FIG. 1 is a front perspective view of the device; and
FIG. 1-A is a fragmentary detail thereof;
FIG. 2 is an operating detail similar to FIG. 1 with portions broken away;
FIG. 3 is an enlarged sectional detail of the positional valve means;
FIG. 4 is a sectional detail ilke that of FIG. 3 with the parts in another operative position;
FIG. 5 is a top view of the device of FIG. 1 with portions broken away.

Resuscitation methods which seek to induce breathing by introduction of air into the lugs of the victim at a rate, volume, and pressure calculated to stimulate or augment natural breathing may involve the use of various types of inhalating or aspirating apparatus, and the like, or may frequently be practiced without such equipment by the simple expedient of rhythmically forcing the rescue operator's breath into the mouth of the victim and observing the chest movements of the latter for indications of natural breathing, this latter type of respiration being commonly known as mouth-to-mouth respiration.

Comprehensive instruction in respiration methods will require that the trainee be familiarized with the use of mechanical respirators as well as the simpler methods requiring no apparatus, such as mouth-to-mouth insufflation.

To facilitate the mouth-to-mouth type of resuscitation, certain simple implements are frequently included in organized rescue equipment, such as the so-called airway tubes comprising various types of curved plastic tube with or without flange means adapted to fit over the victim's mouth, or teeth, and some of which are adapted to be passed into the victim's throat to assure an open air passage. Still another aid of this class is the mouth-to-mask device which includes a flexible tube having a free end received in the operator's mouth and an opposite end terminating in a mask fitting upon the victim's face. It is desirable to instruct trainees in the use of such auxiliary aids.

In the practice of insufflation techniques, it is imperative that the victim, whenever possible, be placed on his back with the head lowered into what is referred to herein as a "critical" position in which the jaw juts upwardly to straighten out the windpipe and provide for maximum freedom of movement of air to the lungs, and to aid in clearing the throat and mouth of all obstructive fluid and foreign matter, and to facilitate scooping the victim's tongue to a non-obstructing position. In actual practice it is desirable to elevate the victim's shoulders by use of a folded coat or the like so that the head can drop definitely and remain in the necessary lowered position.

The use of live models for demonstrating mouth-to-mouth resuscitation, as well as the use of various types of airway tube, masks, and most other respiratory apparatus, is objectionable for sanitary and other reasons, and it is the object of the presently disclosed improvements to provide an excellent substitute for general training and demonstration purposes, and one having the added advantage of impressing the importance of certain techniques upon the trainee by obliging him to go through certain motions in order to produce certain visual results.

A practical form of the novel training device is depicted in FIG. 1 and comprises a base member 10 provided with an upstanding trunnion mount consisting of a pair of cleats 11 suitably secured to the base as by bolts 12, and each having welded or otherwise attached thereto an upright angle iron 13 constituting one of a pair of trunnion posts.

A manikin, consisting of a head portion 15, neck portion 16, and a partial thorax or chest section 17, is both rotatively and rockably mounted between the posts 13 by means of a bearing collar 18A (FIG. 1-A also) in the form of a split annular band having flanges 18B around its two marginal edges to define an annular channel or groove serving as a bearing seat for a swivel mount to support the figure in the region of the neck.

The bearing collar is secured to the neck portion 16 by means of screws or the like, and is adapted to receive a neckband or swivel 20 fitting closely but freely in the bearing collar in such manner that the entire manikin figure may be turned sidewise along the spinal axis through the head and thorax into the dotted-line position indicated in FIG. 5, the purpose for which will be made to appear.

The neckstrap or swivel band 20 is rockably supported between and by the upper ends of the trunnion posts (FIG. 5) by means of aligned and suitably bushed pivot pins 21 fixed to project from opposite sides thereof through corresponding pivot holes at the head of each post, and respectively having threaded ends secured by means such as the wing nuts 22.

Thus, the swivel collar or band 20 will not only rock up and down about a lateral, horizontal trunnion axis X—X through the pivot pins 21 (FIG. 5), but will also turn sidewise in rotative motion about a second axis Y—Y at right angles to the first axis and coinciding with the common centers of the annular bearing collar 18 and the swivel band 20.

Means is provided for yieldingly rocking the figure into a normal position (FIG. 1) in which the head portion 15 thereof is moderately elevated, said means comprising a long traction spring 25 having one looped end 25A hooked into a pair of offset wings 23 struck out at the respective ends of the neckstrap or swivel 20, the opposite looped end 25B of said spring being anchored to means such as a screw eye 26 affixed to the base.

The spring 25 is selected to exert a force sufficient to require a definitely deliberate downward pressure by the operator in the manner illustrated in FIG. 2 in order to lower the head 15 to a limiting position determined by a stop means—such as the post 28 secured to the base member beneath the head and standing at a predetermined height relative thereto which is selected to represent as nearly as possible the proper attitude of the head and jaw of an actual casualty disposed in the approved critical lowered position necessary in the actual practice of this type of resuscitation. A resilient bumper means 29 of rubber or the like is threadably seated atop the post 28.

As indicated by dotted lines 30 in FIG. 1, the manikin is hollow in a zone communicating from the nostrils 31 to the mouth 32 and thence down through the neck and thorax to and through the bottom wall 33 of this section, the opening through which is closed by a chest plate 35 fixed in position by screws.

Secured to the chest closure plate, as in FIG. 3, is a special valve means including a tubular member 40 having an enlarged end portion 41 adjoining its juncture with the chest plate and constituting a well or trap for a poppet ball 42 when the manikin is depressed into the critical positions according to FIGS. 2 and 4.

At its end opposite the ball trap 41 the valve tube has an upwardly-projecting stem 43 with its free upper end closed by an elastic bladder or bag 45 secured thereto by means such as the clamp 46.

In the normally elevated condition of the manikin, the poppet ball 42 will gravitate into a blocking position with the junction of the stem and close off passage of air to the test bladder 45 from the "respiratory" cavity in the manikin; but on tilting of the manikin into the critical resuscitory position indicated in FIG. 2, the valve ball 42 will gravitate back into the enlarged trap or well portion, as in FIG. 4, and permit flow of air from the region of the mouth and nostrils of the manikin for inflation of the test bladder, as depicted in FIG. 2.

For purposes of instructing and practicing the methods of mouth-to-mouth insufflation, the trainee will be considered to approach the manikin victim in the condition represented in FIG. 1, this attitude of the figure serving as a warning to the trainee that the body position is not appropriate for resuscitory manipulations and requires attention.

To dramatize for the student and impress upon him the importance of properly positioning the patient's head, he is instructed, and in fact will ultimately be obliged by this device to learn, that the manikin's head must be lowered upon the stop, as in FIG. 2, before any respiratory air pressures can be effectively applied, whether by insufflation, or inhaling equipment, for he will perceive no responsive lung action in the bladder unless this step is taken.

The novel training device is contrived to demonstrate additional important resuscitory techniques and manipulations, including the disgorgement of saliva, phlegm, water, and other foreign matter from the victim's throat and mouth by the process of turning the head sidewise, as about the spinoid or spinal axis, into the disgorging position indicated by dotted lines in FIG. 5.

In conjunction with the manipulations last mentioned, and in general, it is important that the casualty's tongue be retracted from any air-blocking attitudes in the mouth and be freed from possible seizure between the teeth, and to these ends the mouth 32 is defined by a substantial opening permitting insertion of the finger, as well as various known types of airway, such as the tube 55.

As a hygienic measure, each trainee will preferably be supplied with his own mouth pad 50 made of any suitable molded plastic material with a proper contour to fit snugly upon the mouth and adjacent jaw areas of the head while leaving exposed the nostril openings 31 (FIG. 5), this pad being provided with an opening 52 registering with the mouth opening 32, and the pad 50 preferably being provided with retaining means in the form of an elastic band 53 adapted to pass around the head.

By use of these pads, the trainees will have no reluctance in placing their mouths directly upon their own personally-retained mouth pads in practicing the direct insufflation method. Likewise, each student may have his own personal airway tube 55.

It will be apparent that the training device is also useful in demonstrating the application of various respirator masks such as are commonly used in mouth-to-mask methods and with various types of inhalating apparatus; and the indicating means and the automatic valve means will serve the same purposes when used with such additional equipment as when used for mouth-to-mouth techniques.

In operation, the trainee or instructor approaches the device in the condition of FIG. 1 and may place thereon his own mouth pad 50. The raised attitude of the head 15 signals an improper position in which the supervisory valve means 42—43 would render the lung-simulating bag 45 unresponsive to applied air pressures.

The demonstration proceeds with the lowering of the head part 15 against the stop means 28—29 (about the lateral axis), as in FIG. 2, in which condition the head may be turned (about the longitudinal or spinoid axis) to the dotted-line sidewise position of FIG. 5, in simulation of the manipulation to clear the throat and mouth; and thereafter the head will be returned to face upwardly and the tongue-scooping operation may be performed.

Whether an airway tube 55 be used or the operative's mouth is applied directly upon the mouth pad 50, exhalation will actuate the indicating means by effecting inflation of the test balloon or bag 45, since the proper position of the head against the stop will permit the positionally-controlled poppet ball 42 to pass into the well 41. The trainee will be instructed in the proper rhythm of the insufflation technique, and he will be trained to concentrate upon indications of the simulated lung action in order to establish the habit of watching for natural breathing in an actual victim.

Insofar as an inflatable member such as the bladder 45 is strongly suggestive by way of analogy of the actual responses to be achieved and observed, it is preferred for the intended purposes of training and demonstration. However, it may be desirable at times to substitute another form of pneumatic indicating means, such as a gauge, to be connected at 46, as in conjunction with demonstrations of inhalators.

While a preferred practical embodiment of the device has been illustrated and described in detail, it will be apparent to those skilled in the relevant arts that various changes may be made in such details without departing from the essential features of novelty and utility of the invention, and it is the intention that all such changes shall be comprehended hereby as fairly come within the scope of the appended claims.

I claim:

1. A device for use in demonstrating resuscitory techniques comprising a base means, a manikin having at least a head, neck and appurtenant partial thorax section, means movably mounting said manikin on the base means to tilt about a horizontal axis extending approximately crosswise through the neck region so that the head may be elevated to a normal position and lowered into a desired resuscitory position, said head portion having a mouth and an air passage communicating therewith and leading to and through said partial thorax section, and a positionally-sensitive valve means interposed in said air passage and acting to close said passage in the raised position of the head and gravitationally moving to a by-pass position to allow air flow in said passage when said head is properly lowered for resuscitation.

2. A device according to claim 1 further characterized in that said valve means includes a ball runway extending outwardly to a discharge terminus from said thorax section and communicating with said air passage, a ball valve adapted to roll by gravity in said runway, an enlarged ball well adjacent said thorax section for by-passing air around said ball valve when situated therein, and an air shut-off seat in said runway.

3. A device according to claim 2, further characterized in that said runway includes an exit portion in a direction at right angles to said tilting axis, and an inflatable lung-simulating bag secured to the end of said discharge portion.

4. A device for use in demonstrating resuscitory techniques comprising a base means, a manikin having at least a head with a mouth opening, neck and appurtenant partial thorax section, and bearing means carried by said base and supportably engaging said manikin including band means freely circumambiently embracing said neck such that the manikin may swivel therein about an axis corresponding to the spinal axis so that said mouth opening may be disposed in a drainage position simulative of that for clearing fluids from the victim's mouth, together with pivot means supporting opposite sides of said band means along a horizontal tilt axis whereby the manikin may be tilted from a normal raised position to a lowered critical position deemed essential to artificial respiration techniques.

5. An instruction and training device for artificial respiration techniques comprising a manikin having at least a head, neck, and appurtenant partial chest portions, said head portion having mouth and jaw configurations; mounting means including bearing means supportably engaging the manikin in the region of said neck portion and affording at least two degrees of turning movement to the manikin, one of which is about an axis extending in a direction crosswise of said neck portion whereby the manikin may be tilted up and down to dispose said head portion in predetermined elevated and lowered positions relative to said chest section, and the other of which axes extends through said head, neck, and chest sections at right angles to the first-mentioned axis, whereby the manikin may be rolled to turn the head portion sidewise and dispose said mouth configuration in a simulated drainage position; spring means cooperative with said supporting means to dispose the manikin yieldingly in a predetermined normal position with said head portion above a predetermined critical lowered position and yielding to appropriate downward hand pressure in the head region to rock the same downwardly and dispose said head portion in said critical lowered position; and means for limiting downward movement of the manikin to said critical position, said normal position serving to signify to trainees the necessity for lowering the head portion, and said critical position serving to simulate to trainees a critical position regarded as prerequisite to respiratory efforts at least by methods of insufflation.

6. A device for use in the practice and demonstration of resuscitation techniques, said device comprising a body-simulating member having a part representative of a human head provided with a mouth opening and an air passage communicating therewith, means mounting said member for movements up and down about a horizontal axis lateral to the assumed spinal axis of the body-simulating member, whereby to dispose said head portion in raised and lowered positions relative to the remaining parts thereof, and for supportably engaging said member to permit a sidewise rolling movement thereof about a second axis corresponding to said spinal axis so that said mouth opening may be disposed in a drainage position simulative of that for clearing fluids from the victim's mouth, means yieldably urging said member into a normal approach position to dispose said head portion in a predetermined initial condition of elevation, means operative to arrest the lowering movement of said member with said head portion disposed in a predetermined critical lowered position simulative of an attitude deemed essential to application of artificial air pressures to the facial respiratory openings in actual practice, whereby the trainee may be instructed in, and may practice, at least the techniques of placing a victim's head in the critical position, and applying respiratory air pressures to said mouth opening.

7. In a resuscitation training device, movable means simulating at least the head, neck, and a portion of the chest of a human figure, the head portion including jaw, mouth and nostril configurations, a table base, bearing means carried by said base and supportably engaging said figure and including band means freely circumambiently embracing said neck portion such that the latter may swivel therein, together with pivot means supporting opposite sides of said band means along a horizontal tilt axis, whereby the figure may be tilted about said axis to dispose said head portion at raised and lowered levels relative to said axis or rolled sidewise about a second axis extending through said neck portion into the chest and head portions; spring means acting on said figure to tilt the same to a normal position in which the head portion is in a relatively elevated initial condition, means providing a limiting stop engageable by a part of said movable means to stop the downward tilting displacement thereof with said head portion in a relatively lowered critical position in which said jaw configuration is jutting approximately upwardly and forwardly with said neck portion extending in an approximately horizontally straight attitude in simulation of a straigtened windpipe condition deemed essential to artificial respiration techniques, said movable figure member having an internal air passage interconnecting said nostrils, mouth, and with an exit located in said chest portion, valve means connecting with said exit and providing an air passage and ball runway extending outwardly to a discharge terminus from said chest portion and exit in a direction at right angles to said tilting axis, a valve ball adapted to roll by gravity in said runway; said valve means further providing an enlarged ball well adjacent said exit for by-passing air around the ball when situated therein, an inflatable lung-simulating bag supported in connection with said discharge terminus, means providing an air shut-off seat for said ball in said passage appurtenant to said terminus and gravitationally remote from said well, such that in said normal position of the figure said valve ball gravitates to closed condition with said seat, and gravitates into said well to open said passage responsive to tilting of the figure into the critical position.

References Cited in the file of this patent

FOREIGN PATENTS

H34,772    Germany _____ Nov. 10, 1958